United States Patent [19]

Moreau et al.

[11] Patent Number: 5,138,136
[45] Date of Patent: Aug. 11, 1992

[54] METHOD, CIRCUIT AND APPARATUS FOR SUPPLYING AN ELECTRICAL CURRENT TO A RESISTIVE HEATING ELEMENT

[75] Inventors: Christian Moreau, Sartrouville; Jean Sauron, Draveil, both of France

[73] Assignee: Gaz De France (Service Nation), Paris, France

[21] Appl. No.: 639,669

[22] Filed: Jan. 8, 1991

[30] Foreign Application Priority Data

Jan. 11, 1990 [FR] France .................. 90 00287

[51] Int. Cl.⁵ .............................. H05B 1/02
[52] U.S. Cl. .................. 219/505; 219/494; 219/501; 219/535; 307/75; 307/43
[58] Field of Search ............ 219/130.1, 130.4, 130.51, 219/535, 121.48; 315/111.21; 307/43, 117, 72, 75

[56] References Cited

U.S. PATENT DOCUMENTS

| | | | |
|---|---|---|---|
| 3,593,197 | 7/1971 | Carreras ....................... | 307/301 |
| 4,105,437 | 8/1978 | Liu ............................... | 219/121.52 |
| 4,475,028 | 10/1984 | McGuire, Jr. et al. ........ | 219/130.51 |
| 4,602,193 | 7/1986 | Patonay et al. .............. | 307/43 |

FOREIGN PATENT DOCUMENTS

| | | |
|---|---|---|
| 0082451 | 12/1982 | European Pat. Off. . |
| 0299833 | 6/1988 | European Pat. Off. . |
| 0155300 | 6/1990 | France . |
| 668741 | 12/1978 | Switzerland . |

*Primary Examiner*—Mark H. Paschall
*Attorney, Agent, or Firm*—Morrison Law Firm

[57] ABSTRACT

The invention relates to a system for processing an electrical power supply signal for a resistive heating element.

The circuit provided comprises an a.c. current source, a rectifier and a chopper for supplying the resistive element with a current having two superimposed components one being d.c. and the other being a.c., both at a variable voltage.

The invention applies particularly to the supplying, with a signal thus processed, of the resistive element of a connecting piece for electro-weldable plastic tubes, of an electro-heating envelope for the connection or protection of pipes, or of a heat-shrink sheath for operation on a cable having a conductor or conductors used for the carrying of electrical energy or for telecommunications.

11 Claims, 2 Drawing Sheets

METHOD, CIRCUIT AND APPARATUS FOR SUPPLYING AN ELECTRICAL CURRENT TO A RESISTIVE HEATING ELEMENT

BACKGROUND OF THE INVENTION

The purpose of the invention is to propose a new type of electrical energy power supply of an electrical resistive heating element with processed signal enabling in particular an improvement in the heating conditions by means of the Joule Effect of the resistive element and a very great reduction in the weight of generator type equipment fitted with a corresponding power supply circuit.

The invention is particularly applied, in the gas field and in the distribution of water or the flow of waste water, for the electrical energy supply of accessories generally denoted by the term "electro-weldable", principally intended for the construction or repair of pipe systems made from plastic material, such as high density polyethylene (density usually between 920 and 950 kg/m$^3$) or for example made from polypropylene. Still in the same field, the invention could be used for the supply of electro-heating accessories, particularly heat-shrink accessories, for the repair of cast iron or steel pipes, or for ensuring their heterogeneous assembly (different materials).

Another possible application of the invention could relate to the field of industrial electricity and in particular to the supply of thermo-mouldable accessories for the protection, repair or maintenance of electrical cables or of telecommunications networks.

Various systems of course already exist on the market for supplying a resistive heating element with the desired electrical energy.

Known systems operate for supplying, from a 110 or 220 volt a.c. source, a voltage which is usually a reduced voltage in a range of approximately 12 to 48-50 volts, by means of an electromagnetic induction transformer, or even an auto-transformer.

Such supply systems must be able to be used on the ground, the a.c. sources are usually constituted on the basis of a worksite generator or a so-called "portable" generating set, capable of supplying in the order of 2 to 4 kwatts and having a weight usually in the order of 20 to 25 kg, i.e. heavy and bulky in fact.

Another disadvantage of the known systems is that they re-inject current harmonics into the mains used for supplying the resistive element. And the voltage harmonic interference which can also appear can even lead to significant downgrading of the generator between the nominal power and the actually usable power.

SUMMARY OF THE INVENTION

An object of the invention is to solve these problems by proposing a solution enabling a substantial reduction in the difference between the nominal power and the usable power, a very great reduction in the reinjection of harmonics, a substantial limitation in the weight of the overall supply system and a control of the heating power of the electrical resistive heating element.

For this purpose, the invention firstly proposes a method intended to process an electrical power supply signal for a resistive heating element embedded in a plastic envelope, this method being characterized in that:

starting from an a.c. source, the current supplied by the said source is rectified in order to obtain a unidirectional signal, and this signal is processed in order to supply a processed signal comprising two superimposed current components at variable voltage, one d.c. and the other HF (high frequency) a.c., and the resistive heating element is supplied with the said processed signal.

In addition to this method, the invention also relates to a power supply circuit such as provided for supplying electrical energy to the resistive heating element in question. This circuit is characterized according to the invention in that it comprises;

an a.c. source a current rectifier capable of supplying a unidirectional signal, and a chopper capable of supplying to the terminals of the said resistive element a current having two superimposed components one being d.c. and the other being HF a.c., both at a variable voltage.

The invention furthermore relates to the use of this circuit for supplying with such a processed signal the electrical resistive element of a cover or a connecting or repair sleeve used on pipes in which a gaseous fluid or water (clean or waste) can flow, or on electrical or telecommunications cables.

BRIEF DESCRIPTION OF THE DRAWINGS

Other characteristics and advantages of the invention will also appear in the following description referring to the appended drawings which are given solely by way of example and in which.

DETAILED DESCRIPTION OF THE DRAWINGS

Figure 1:
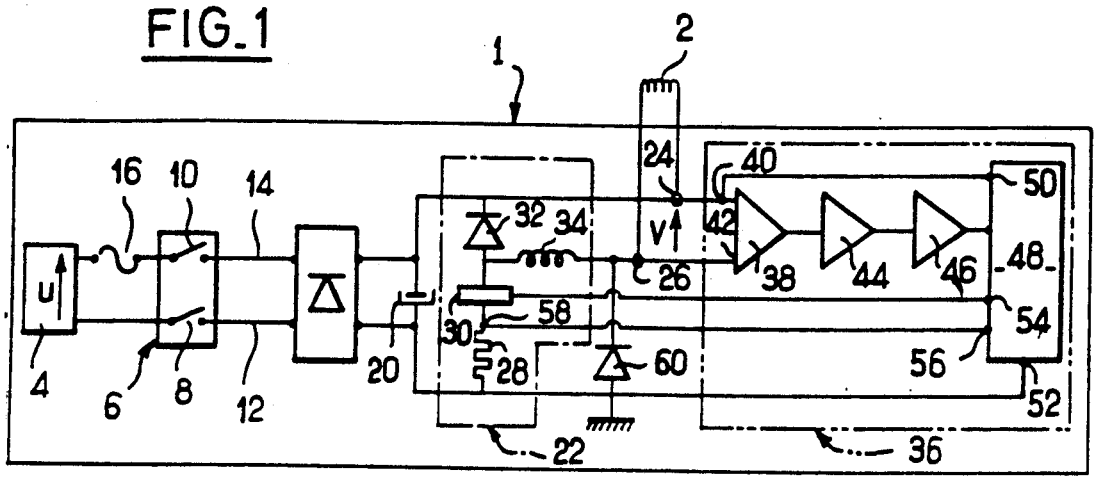
FIG. 1 is a block diagram of a typical electrical circuit according to the invention enabling the supply of a resistive heating element with a chopped signal having a relatively high frequency component.

Referring firstly to FIG. 1, there can be seen the typical circuit provided in the invention for providing a frequency chopping of a voltage from a rectified signal coming from an a.c. source, in such a way as to supply to an electrical resistive heating element 2 a processed signal comprising two superimposed current components, one being d.c. and the other being HF a.c., both at a variable voltage.

More precisely, the circuit shown firstly comprises an a.c. source 4 which can be constituted by a worksite generator capable of supplying a voltage in the order of for example 200 to 240 volts with a possible frequency of 50 to 60 Hertz.

For safety, a contactor with differential protection 6 protects the circuit via two switches 8, 10 respectively provided on the ground line 12 and on the supply line 14, with the interposition in this supply line of a fuse 16.

At 18 there has been shown a current rectifier capable of supplying from the a.c. current which it receives a unidirectional signal to a smoothing element such as a capacitor 20 connected between the output, supply and ground lines of the rectifier 18.

It is possible, for example, to use a single-phase bridge as a rectifying element.

At the output of the smoothing capacitor 20, the rectified unidirectional signal is processed by a static converter of the chopper type 22 capable therefore of delivering on output, to the terminals 24 and 26 of the electrical resistive element 2, a current having two associated components one being d.c. and the other being a.c., both at variable voltage V normally less than or equal to the voltage U at the terminals of the a.c. source 4.

As a general rule, the voltage V can vary between 10 and 110 volts, and will generally, particularly in applications in the gas field, be between 10 and 50 volts approximately.

As is clearly shown in FIG. 1, the chopper 22 firstly comprises, connected in series between the rectified current supply line and the ground line of the circuit, a "shunt" (or branch) resistor 28 for measuring this supplied current, of which one of the terminals is connected to the ground line and of which the other terminal is connected to a switching element 30 forming a unidirectional conduction voltage regulator which is itself connected by one of its terminals to the anode of a "free wheel" diode 32 whose cathode is connected to the rectified current supply line. To the anode of the diode 32 there is also connected an induction coil 32 whose other terminal is connected to the terminal 26 of the resistive element 2, this induction coil acting on the amplitude of the regulated current as a function of the switching frequency of the regulator 30.

The regulator 30, which can be constituted by a transistor such as "power Darlington" is, for its functioning, placed under the control of control means forming the analog regulation stage 36.

These control means firstly comprise a differential amplifier 38 whose inputs 40, 42 are connected to the output of the chopper i.e. to the terminals 24 and 26.

At the output of the differential amplifier 38, the corresponding signal then passes into an r.m.s. value converter 44 and then into a PID (proportional-integral-differential) amplifier 46, and is then received in an analog/digital converter 48 constituting the control circuit of the transistor 30, i.e., controlling its switching frequency, the current flowing, its supply voltage and its on/off functioning.

As the control unit 36 thus constituted is of conventional structure, it will not be described in greater detail.

It will be simply noted again that the control unit 48 is of course connected at 50 and 52 respectively to the supply and ground lines of the circuit and that its additional terminals 54 and 56 are respectively connected to the transistor 30 and to a point 58 of connection on the link between resistor 28 and the transistor 30.

It will also be noted that for safety reasons there has been provided a protective diode 60 connected by its anode to the ground line and by its cathode to the link line between the induction coil 34 and the connection terminal 26 of the resistive heating element 2 which the present circuit must supply.

From the structural description of the circuit which has just been given, it clearly appears that it will be possible, according to the invention, to regulate the output voltage supplied to the terminals of the resistive element 2 with a high frequency chopping of the voltage (provided a priori between 1 and 100 KHz approximately) and with a superimposition of the signal processed by the chopper 22 having the d.c. and a.c. components modulable through the induction coil.

By the possible control of the HF a.c. component of this current, and in the case in which the resistive element 2 would consist of a wire or an electrically conductive cable, it will thus be possible to concentrate the energy or heating power supplied to the resistive element at the periphery of the wire, thus improving or at least favourably modifying the fusion characteristics of the material within which this resistive element is usually disposed, taking account of the preferred fields of application of the invention which will now be quickly described.

Before this, it will be noted that despite everything there are still three advantages inherent to the invention, namely:

the possible increase, with respect to conventional power supply generators, of the amplitude of the undulating signal used as a component of the signal supplied to the resistive element 2, the reduction of the re-injection of current harmonics into the power supply network of the resistive element, and the possibility of proposing generators of distinctly reduced weight, in the order of 4 to 5 kilos for a power in the order of 3 to 5 kW and an output supply voltage in the order of 50 volts.

Figure 2:
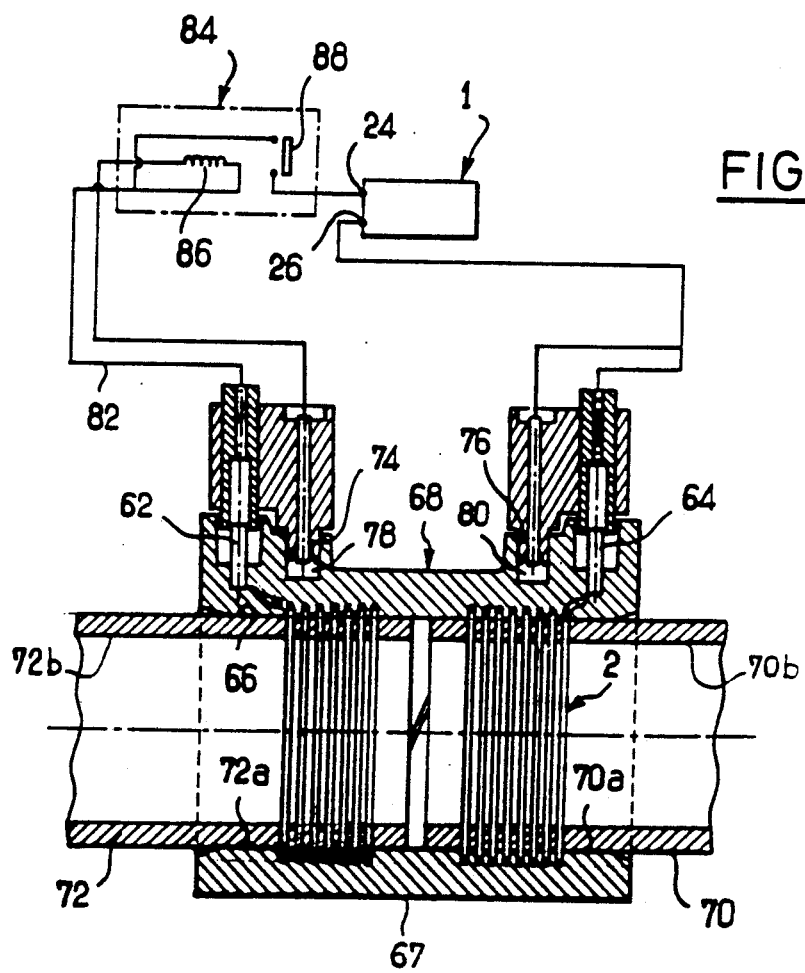
FIG. 2 is a diagram showing the application of the invention to the connection by welding of pipes made from thermoplastic material, using an electro-weldable connecting piece.

Reference will now be made to FIG. 2 which shows a first example of a preferred application of the invention, namely the supply of an electro-weldable accessory intended for the production or repair of pipes made from plastic material, (and more particularly from thermoplastic material) used for the distribution of natural gas.

In this FIG. 2 there is a diagrammatic representation, still with the reference 1, of the whole of the electrical circuit of the invention shown in FIG. 1.

In this case, the two terminals 24 and 26 of the circuit 1 are connected to two connection tags 62 and 64 for the connection of the resistive element 2 which, can have the form of a wound electrical wire disposed in the immediate proximity of the inside connecting surface 66 of the connecting member of the electro-weldable accessory 68, such as a sleeve, whose interior orifice receives relatively tightly one or two cooperating members such as pipes 70 and 72 inserted end to end inside the sleeve in such a way that each presents a junction surface 70a, 72a contiguous to the connection surface 66 of the orifice of the member 68 in an inner zone of welding.

Among the termo plastic material which can be used to produce the pipes to be joined and the body of the accessory 68, the following can be quoted in particular: polyethylene, polyamide, polybutylene and polypropylene.

The uniting by welding of said at least two members comprises the following steps:

bringing substantially together the contiguous surfaces of the member passing the electrical current of d.c. and HF a.c. components through the resistive electrical current path 2 for heating by Joule effect, the material of said members to welding temperature in the inner weld zone only while leaving enveloping outer portions 67, 70b, 72b of the members (FIG. 2) at lower temperature (lower than the temperature of fusion)

and cutting off the supply of electrical current to the resistive path 2 when said predetermined welding temperature is reached.

For the controlling of this welding, it will also be noted in FIG. 1 that the accessory 68 has been fitted with two sensors 74 and 76 of which one end protrudes into a cavity, respectively 78 and 80, radially extended from the outer surface of the sleeve up to the vicinity of the closest portion of the facing resistive element.

During the heating, the surrounding plastic material brought to its fused state will be able, under the effect of pressure, to thus expand into the cavities and operate the sensors 74 and 76, which for example will be able to consist of microswitches or of optical sensors capable of detecting variations in the physical state of the material inside the cavities, in such a way as to cause the stopping of the heating by switching off the electrical energy supplied to the resistive element 2, as soon as the welding conditions have been achieved.

For this purpose, provision has also been made, on the conductor which supplies the terminal 62 of the resistive element, for the interposition of a control unit such as 84 comprising a relay 86 which is manually engaged via the push-button 88 and whose release is automatically controlled by the sensors 74 or 76.

Other means of control of the time during which the electrical resistance is supplied with electrical energy could of course have been provided.

Figure 3:
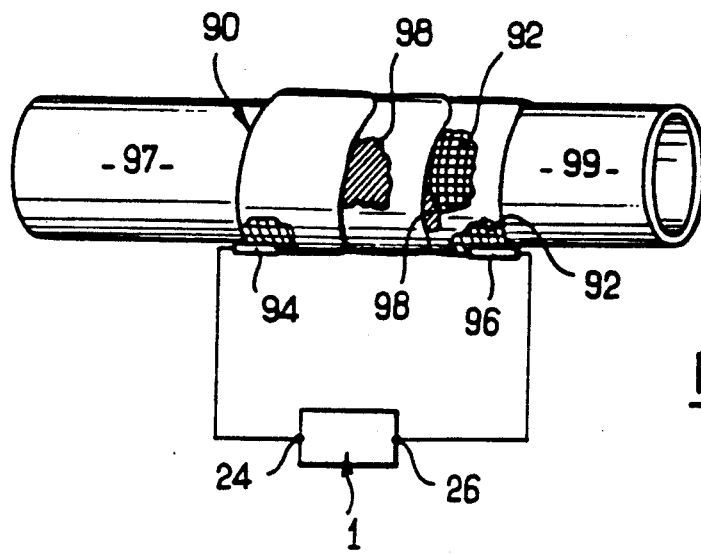
FIG. 3 is a diagram of another application of the invention used for the insulation of metal pipes by means of an electro-heating cladding envelope made from heat-shrink material.

FIG. 3 shows the case of application of the circuit of the invention to the supply of an electro-heating accessory 90 provided for the cladding of metal pipes, for example steel pipes, widely used for the distribution of natural gas (under pressure) or water.

In this FIG. 3, the known electro-heating element 90 is in the form of a wound, heat-shrink strip which clads, at the location of their connection by welding, two pipes 97 and 99 placed end to end and which comprises, within its thickness, a resistive heating element shown at 92 and fitted with its two connection terminals 94 and 96 connected of course to the two output terminals 24 and 26 of the circuit of the invention (still referred to in its entirety 1), in such a way that the current supplied by this source heats, as before by the Joule effect, the resistive element 92 until the shrinking of the strip 90 occurs, thus providing the insulation of the end portion of the pipes 97 and 99 which it covers. In FIG. 3, as also in FIGS. 4a, 4b and 5 which will follow, it will be noted that no interest is taken in the section relating to the unit controlling the heating time of the resistive element which is not the object of the invention.

On the other hand it will be noted that in this case the strip 90 which therefore forms a kind of protective cover for the thermal insulation of the pipes (with the possible addition of a cladding envelope of insulating foam) comprises an external heat-shrink meshed layer applied or rolled onto an internal connecting layer 98 made from compatible plastic material, such as polyethylene which, after cladding the tube, will connect in a gas-tight manner the pipe envelope seal, this pipe and the strip itself in order to consolidate its various layers.

Figure 4A:
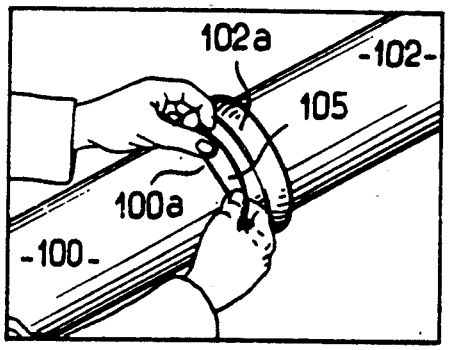
FIGS. 4a and 4b illustrate, still diagrammatically, yet another application of the invention to the repair of two metal pipes having a butting male-female ends, using an electro-heating heat-shrink envelope.
Figure 4B:
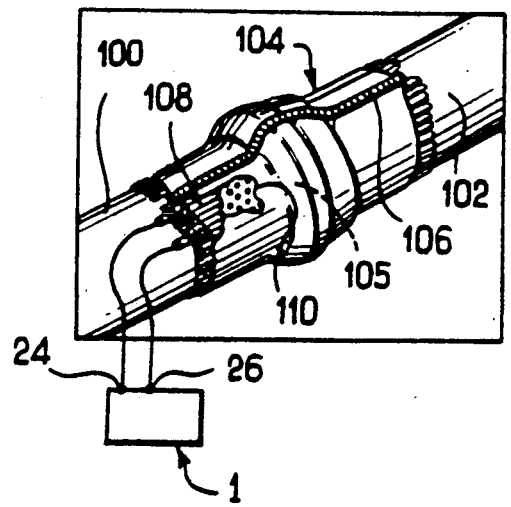

The third preferred application of the invention which has been shown in diagrams in FIGS. 4a and 4b relates to the repair of two abutted metal pipes 100 and 102 for the distribution of gas under pressure, axially located one inside the other by means of their ends respectively male 102a and female 100a, and whose connection must be maintained gas-tight, by means of an electro-heating heat-shrink envelope 104 (FIG. 4b) which is known per se.

As can be seen in FIG. 4a, before positioning the envelope, it is recommended to limit gas leakages at the location of the abutting of the tubes by means of a mastic seal 105. Then, around this first seal there is disposed another flexible seal made from fusible heat-shrink material (not shown) which will be covered by the electroheating envelope 104 closed by its zip slider 106. In order to perform its function, the envelope 104 comprises an electrical resistive heating element having an electrical wire or electrical wires in a snake type pattern as shown at 108, and a thermo-fusible adhesion material shown at 110.

As before, in order to allow the shrinking of the cover, the connection terminals of the resistive element 108 are connected to the two outputs 24 and 26 of the circuit of the invention shown diagrammatically again at 1. Before making the current flow in order to shrink the envelope, it is recommended to surround the latter with a removable thermal and electrical insulating cover provided for this purpose (not shown).

In relation to the two previous applications, it is also possible to mention the entirely appropriate use of the invention in the field of the joining or repair of pipes made of different materials, i.e. metal (cast iron steel . . . ) and plastic material (particularly thermoplastic: polyethylene, polypropylene . . . )

As in the two previous cases, use will be made of a known electro-heating sleeve or cover (which is heat-shrinkable) (not shown) and correctly positioned around the joint of the pipes to be connected or repaired, the sleeve being composed of several layers of heat-shrink material(s) reinforced with glass fibres and coated with a compatible adhesive. The sleeve will of course be fitted with an incorporated heating wire, flexible and operating at the required voltage, in order to obtain a connection by reticulation and by irradiation; the adhesive providing a long-life sealing and the reinforcement produced by the glass fibres providing the required mechanical strength.

Figure 5:
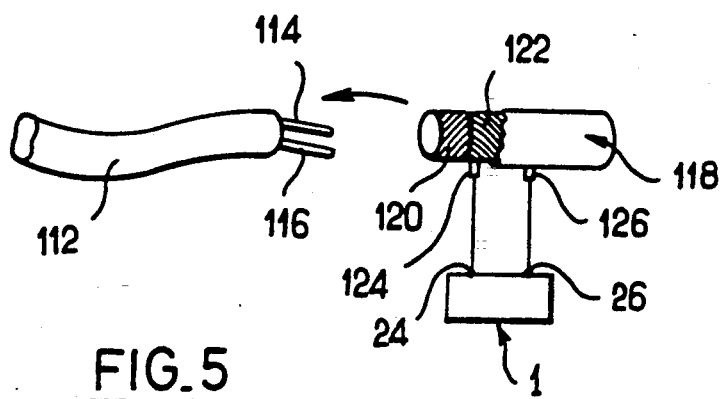
FIG. 5 shows, still diagrammatically, an additional application of the invention within the scope of an intervention on a cable having metal wires used for the carrying of electrical energy or for telecommunications.

Referring now to FIG. 5 there can be seen another particular application of the invention to the electrical supply of a thermo-mouldable accessory for the protection, repair or maintenance of a cable having a body of plastic material cladding a metal wire or metal wires used for the carrying of electrical energy or for telecommunications.

In the scope of this application, and as appears clearly in FIG. 5, the stripped end of a cable 112 having conductive wires 114 and 116 will be covered with an electro-heating sheath or cover 118 which is pre-moulded and has a known laminated multi-layer structure comprising a heat-shrink portion 120 having a layer of thermo-fusible adhesive material and fitted with a resistive heating element 122 which can be constituted by a layer of electrically conductive polymer material.

Of course in order to obtain the shrinkage of the sheath after having placed it over the stripped end of the wires with partial covering of the insulating envelope of the cable 112, the two connection terminals 124 and 126 of the resistive element 122 will be connected to the two connection tags 24 and 26 of the power supply circuit of the invention, still represented by the block 1, in such a way as to raise, by the Joule effect, the resistive element to a sufficient temperature to induce a reticulation by irradiation with shrinkage of the sheath thus ensuring its gas-tight connection with the cable 112, while enabling a zone to be reserved around the stripped wires forming an internal chamber which can possibly be pressurized.

It will be noted that this application can relate to all types of polyethylene or lead cables, coaxial cables, twin cables or optical fibres.

We claim:

1. Method for supplying an electrical current to a thermoresistance located in a member of plastic material to be heated by said thermoresistance, said method comprising the following steps:
   a) rectifying an a.c. current supplied by an a.c. source for obtaining an unidirectional current;
   b) processing said unidirectional current for supplying to said thermoresistance a processed current comprising two superimposed current components, one being a.c. and the other being d.c., and
   c) controlling said a.c. and d.c. currents for adjusting the voltage supplied to terminals of the thermoresistance as a function of the heating power to be delivered to said member.

2. A method according to claim 1, wherein step (c) comprises controlling the a.c. current for concentrating the electrical heating power towards the periphery of the thermoresistance.

3. A circuit for supplying an electrical current to a resistive element or thermoresistance disposed in a member to be heated by the termoresistance, said circuit comprising:
   a) an a.c. source;
   b) a current rectifier connected to said a.c. source for rectifying said a.c. source to a unidirectional current;
   c) a chopper connected to said current rectifier for supplying to said resistive element, a current having two superimposed components comprising a.c. and d.c. components; and
   d) means for controlling said a.c. and d.c. currents for adjusting the voltage supplied to terminals of the thermoresistance as a function of the heating power to be delivered to said member.

4. A circuit according to claim 3, wherein the control a.c. and d.c. current means comprise adjusting a.c. means for concentrating the electrical power towards the periphery of the thermoresistance.

5. A circuit according to claim 3, wherein a capacitor is interposed between said current rectifier, and said chopper is connected between said power supply line, and said ground line for smoothing said unidirectional current.

6. A circuit according to claim 3, wherein the voltage supplied by said chopper to said resistive element is between about 10 and about 110 volts, and the frequency of said a.c. component of current supplied to the resistive element is between about 1 and about 100 kHz.

7. A circuit according to claim 6, wherein the voltage is between about 10 and about 50 volts.

8. A circuit for supplying a resistive element or thermoplastic with an electrical current, said circuit comprising:
   a) an a.c. source;
   b) a current rectifier connected to said a.c. source for rectifying said a.c. source to a unidirectional current;
   c) a chopper connected to said current rectifier for supplying to said resistive element, a current having two superimposed components comprising high frequency a.c. and the other being d.c., said chopper comprising:
      i) a switching element forming a unidirectional conduction voltage regulator;
      ii) a shut resistor having a first terminal connected to ground line of said circuit and a second terminal connected to a first terminal of said switching element;
      iii) a diode whose cathode is connected to said resistive element through a power supply line of said circuit and whose anode is connected to a second terminal of said switching element;
      iv) an induction coil having a first terminal connected between said second terminal of the switching element and the anode of said diode, and a second terminal connected to the resistive element for modifying the amplitude of the current supplied to the resistive element as a function of the switching frequency of the switching element; and
      v) control means for controlling said switching element.

9. A circuit according to claim 8, wherein said switching element is a transistor.

10. Apparatus for supplying an electrical current to a resistive element disposed within a first member having a surface to be thermally joined to a surface of a second member at a predetermined temperature, said apparatus comprising:
    a) an a.c. source;
    b) a current rectifier connected to said a.c. source for rectifying the a.c. to a unidirectional current;
    c) a chopper connected to said current rectifier for supplying to the resistive element an electrical current having two superimposed components comprising an a.c. source and a d.c. source, for heating the resistive element to a predetermined temperature; and
    d) control a.c. and d.c. current means for adjusting the voltage supplied to terminals of the resistive element as a function of the heating power to be delivered to said first and second members.

11. Apparatus for supplying an electrical current to a resistive element disposed within a first member having an inner surface for overlapping in a substantially mutual contact, an outer surface of a second member, said first and second members of a thermoplastic insulating material welded together about said surfaces at a predetermined temperature, said resistive element being disposed in an inner zone of said first member adjacent to the inner surface thereof, said apparatus comprising:
    a) an a.c. source;
    b) a current rectifier connected to the a.c. source for rectifying the a.c. source to a unidirectional current; and
    c) a chopper connected to the rectifier for supplying the resistive element with an electrical current having two superimposed components comprising an a.c. component and a d.c. component, wherein the materials of said members are capable of being heated to the welding temperature in the vicinity of said surfaces, while leaving at a lower temperature, portions of said members distal to said respective inner and outer surfaces thereof.

* * * * *